May 21, 1963   F. GASCHE   3,090,630
HIGH PRESSURE JOINT
Filed Jan. 7, 1960

INVENTOR.
Fred Gasche
BY Ralph Hammar
Attorney 3,090,630
HIGH PRESSURE JOINT
Fred Gasche, Erie, Pa., assignor to Autoclave Engineers,
Inc., Erie, Pa., a corporation of Pennsylvania
Filed Jan. 7, 1960, Ser. No. 1,118
1 Claim. (Cl. 277—171)

This invention is a high pressure joint which can be taken apart and put back together again many times without changing the gaskets. Such a joint is useful in autoclaves for high pressure chemical research where access to the reaction products is obtained by taking off the cover at the end of each run.

The joint has a resilient metal gasket, usually of the same metal as the body and cover, with narrow annular sealing lands on the upper and lower surfaces occupying only a fraction of the radial width of the gasket. The lands converge toward each other in a radially outward direction at an acute angle and seal against mating converging surfaces of the cover and body. If the cover and body should separate, sealing contact is maintained by radial expansion of the gasket. The gasket takes substantially no set so that it may be repeatedly reused.

Figure 1:
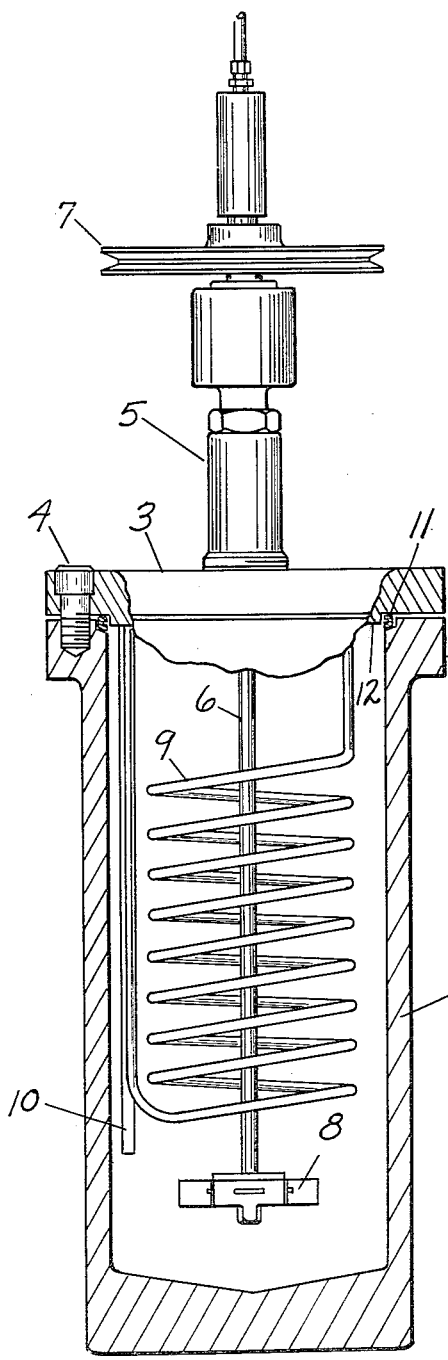
Figure 2:
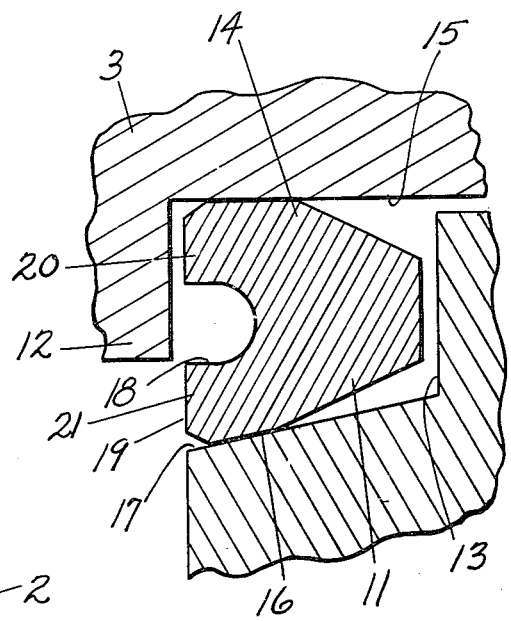

In the drawing, FIG. 1 is a vertical section of an autoclave and FIG. 2 is an enlarged fragmentary radial section through the joint between the cover and body of the autoclave.

In the drawing, the conventional parts of the autoclave are readily identified, 1 being the body with an outwardly extending flange 2 at the top providing a bolt circle for a cover 3 which is secured to the body by bolts 4. At the center of the cover is an upstanding projection 5 in which is journaled an agitator shaft 6 driven by a pulley 7. At the lower end of the agitator shaft is an impeller 8 for agitating the contents which may be heated or cooled, as the case may be, by a heat exchange fluid circulated through a coil 9. A thermocouple 10 depends from the cover to the lower part of the body. These and other parts not shown are common to autoclave construction.

At the end of each run, access to the reaction products is obtained by removing the cover. This may have to be done several times a day. Heretofore this has required frequent replacement of gaskets between the cover and body. In the present construction, the gasket 11 between the cover and body is made of a metal ring, usually of the same material as the cover and the body so that it will have the required corrosion resistance and other properties. As shown in greater detail in FIG. 2, the gasket is received in a recess formed between a projection 12 on the cover and a groove 13 in the body. The inside diameter of the gasket is greater than the outside diameter of the projection 12 on the cover. The outside diameter of the gasket is less than the inside diameter of the groove 13. The gasket accordingly is free to float and assume the position required for sealing. At the top of the gasket is a narrow horizontal land 14 which mates with the horizontal surface 15 on the under side of the cover. At the bottom of the gasket is a narrow land 16 directly beneath the land 14 which mates with an upwardly inclined surface 17 at the bottom of the groove 13 in the body. The lands 14 and 16 and the surfaces 15 and 17 are smooth and free from scratches which could cause leakage. The joint is established by tightening the bolts 4 to establish the sealing contact between the lands 14 and 16 and the surfaces 15 and 17. The cover 3 and flange 2 are out of metal to metal contact with each other. Under pressure, the bolts 4 tend to stretch, permitting further separation of the surfaces 15 and 17. In order to maintain sealing contact with the lands 14 and 16, the gasket expands radially and, since the surfaces 15 and 17 converge radially outward, the radial expansion of the gasket maintains the sealing contact.

The maintenance of the sealing contact with the gasket is facilitated by a groove 18 centered on the inner edge 19 of the gasket and of substantially the same width and depth as the width of the lands 14 and 16. There is a section of axially extending solid metal in direct thrust transmitting relation between the lands 14 and 16 which is not interrupted by the groove. The groove makes the ring more resilient in a radial direction to permit radial expansion of the ring under pressure. This tends to maintain the sealing contact with the lands 14 and 16.

Because the gasket 11 is made of the same material as the cover and body, it has the required hardness resilience and corrosion resistance to permit repeated reuse of the gasket. This is important in autoclaves where access to the reaction products at the end of each run is by taking off the cover. This means that the joint between the cover and body may be broken as often as several times a day. With gaskets of soft material, frequent changing of gaskets was necessary. The present gasket can be used repeatedly so long as care is taken in preventing scratching of the surfaces of the lands 14 and 16.

When the gasket is used for the first time in the autoclave, it may take a slight set to accommodate the surfaces on the cover and body, particularly if the first use is when the autoclave is tested under over pressure conditions. Thereafter, the gasket does not take further set and the life of the gasket is apparently limited by scratching of the lands.

In the particular autoclave illustrated, which is designed for an operating pressure of 3,000 pounds per square inch at 650 degrees F., the lands 14 and 16 can have a width of substantially $\frac{1}{16}$ of an inch and the inclination of the surface 17 can be substantially 15 degrees.

What is claimed as new is:

A high pressure flange joint, comprising two joint members each with a flange, means for clamping the flanges together short of metal-to-metal contact with each other, one of said members having a projection and an axially facing annular surface surrounding said projection, the other of said members having a groove surrounding said projection with an annular surface at the bottom of the groove in opposed relation to and axially spaced from said first annular surface, said members defining a gasket recess, said annular surfaces converging toward each other in a radially outward direction at an acute angle, an annular gasket of resilient metal clamped between said surfaces, the inside diameter of the gasket being larger than the outside diameter of the projection and the outside diameter of the gasket being less than the inside diameter of the groove whereby the gasket is free to float and assume the position required for sealing, said gasket having at its center opposed narrow annular lands with axially extending solid metal in direct thrust transmitting relation between the lands, said lands converging toward each other in a radially outward direction at an acute angle and respectively presented toward and mating with one and the other of said surfaces, and the inner edge of the gasket being exposed to the internal operating pressure to expand the gasket radially to maintain the sealing engagement with said lands, in case said surfaces on the joint members should separate.

References Cited in the file of this patent
UNITED STATES PATENTS

| 1,866,160 | Griswold | July 5, 1932 |
| 2,321,791 | Beardsley | June 15, 1943 |

FOREIGN PATENTS

| 627,554 | France | Oct. 7, 1927 |